(12) United States Patent
Oh et al.

(10) Patent No.: US 9,116,014 B2
(45) Date of Patent: Aug. 25, 2015

(54) APPARATUS AND METHOD FOR ENERGY DISPLAY

(75) Inventors: Jung Hwan Oh, Seoul (KR); Jae Seong Park, Daejeon (KR); Dongmin Son, Suwon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 665 days.

(21) Appl. No.: 13/398,742

(22) Filed: Feb. 16, 2012

(65) Prior Publication Data

US 2012/0232816 A1    Sep. 13, 2012

(51) Int. Cl.
*G06F 19/00* (2011.01)
*G01D 4/00* (2006.01)
*G06Q 50/06* (2012.01)
*G06F 11/30* (2006.01)

(52) U.S. Cl.
CPC ............ *G01D 4/004* (2013.01); *G06Q 50/06* (2013.01); *Y02B 90/242* (2013.01); *Y02B 90/246* (2013.01); *Y04S 10/60* (2013.01); *Y04S 20/322* (2013.01); *Y04S 20/38* (2013.01); *Y04S 20/42* (2013.01)

(58) Field of Classification Search
CPC ....... G06F 1/3203; G01R 22/00; Y04S 20/38; Y04S 20/40
USPC .......................................................... 702/62
See application file for complete search history.

(56) References Cited

FOREIGN PATENT DOCUMENTS

| CN | 201360134 | 12/2009 |
|----|-----------|---------|
| CN | 101661591 | 3/2010 |
| JP | 2002-324112 | 11/2002 |
| JP | 2003-316922 | 11/2003 |
| JP | 2009-259125 | 11/2009 |
| JP | 2011-15521 | 1/2011 |
| KR | 10-2011-0009803 | 1/2011 |

OTHER PUBLICATIONS

Panasonic Electric Works Co LTD (hereinafter "Panasonic") (JP 2009-259125) (Machine Translation provided by Examiner).*
Panasonic Electric Works Co LTD (hereinafter "Panasonic") (JP 2009-259125)(English Abstract submitted by Applicants).*
The State Intellectual Property Office of the People's Republic of China Application Serial No. 201210059959.3, Office Action dated Sep. 10, 2014, 7 pages.

(Continued)

*Primary Examiner* — Phuong Huynh
(74) *Attorney, Agent, or Firm* — Lee, Hong, Degerman, Kang & Waimey (57) ABSTRACT

The present disclosure enables comparison of an energy consuming propensity of each energy consumer with that of other energy consumers. To this end, energy usage information of each energy consumer and comparison conditions (size of house, the number of families, energy consuming regions) are collected, and energy consuming propensities of other energy consumers are compared with energy consuming propensity of each energy consumer similar in terms of living environment, and the comparison is shown. A variety of statistical information for comparison is provided through an IHD (In-Home Display) installed at each house, whereby the energy consumers can easily and conveniently evaluate his own energy consuming propensity. An objective evaluation of his or her position related to energy consumption of other energy consumers promotes more active energy conservation and more rational energy consumption by being stimulated by the energy consumption of other energy consumers.

14 Claims, 7 Drawing Sheets

(56) References Cited

OTHER PUBLICATIONS

Japan Patent Office Application Serial No. 2012-050090, Office Action dated May 28, 2013, 3 pages.
Korean Intellectual Property Office Application Serial No. 10-2011-0020250, Office Action dated Jun. 1, 2012, 6 pages.
Keiko, et al., "Advanced Metering Infrastructure for Smart Grid," Toshiba Review, vol. 65, No. 9, 2010, 4 pages.
Shimizu, et al., "A study on power optimization with inter-zone optimization and inter-area optimization," IEICE General Conference 2010, Mar. 2010, 2 pages.

* cited by examiner

APPARATUS AND METHOD FOR ENERGY DISPLAY

Pursuant to 35 U.S.C. §119 (a), this application claims the benefit of earlier filing date and right of priority to Korean Patent Application No. 10-2011-0020250, filed on Mar. 8, 2011, the contents of which is hereby incorporated by reference in their entirety.

BACKGROUND OF THE DISCLOSURE

1. Field

The present disclosure relates to an apparatus and method for energy display, and more particularly to an apparatus for energy display and a method thereof configured to compare energy consuming propensity of a user with that of another user having a similar living environment, thereby promoting a more active energy conservation and rational energy consumption.

2. Background

Recently, various attempts have been waged to reduce energy consumption by more effectively using energy resources. In relation thereto, and as a non-limiting example, a smart grid has surfaced.

The smart grid, in association with information and digital technologies, is a next generation power grid and a key element of a comprehensive strategy to increase energy reliability and efficiency, reduce energy costs, and lower greenhouse gas emissions. Smart grid technologies provide the ability to capture real-time or near-real-time end-use data and enabled two-way communication.

Along with the smart grid, a smart meter is an energy meter coupled with a communication function that also enables to capture real-time or near-real-time end-use data and enabled two-way communication. In other words, the smart meter is a type of advanced meter that identifies consumption in more detail than a conventional meter. The smart meter may then communicate that information via some network back to the local utility for monitoring and billing purposes (tele-metering).

As a result, remote metering is enabled to accurately measure energy consumption, avoiding the need to employ a fleet of meter readers to take meter readings.

In a smart grid society, residential, commercial and industrial establishments are typically provided with smart meters and IHDs (In Home Displays) for measuring consumption of commodities, including electricity, gas and water, through which many variety of energy use equipment can be controlled and monitored, and lots of energy-related information can be also offered.

Meantime, even in a smart grid society, efforts by each energy consumer to actively control and rationally consume the energy must be waged after all for rational energy conservation and consumption. To this end, there is a need for each user to precisely know and objectively evaluate own energy consuming propensity.

SUMMARY

The present disclosure has been proposed to solve the foregoing need, and an object of certain embodiments of the present disclosure is to provide an apparatus and method for energy display (hereinafter referred to as "energy display apparatus and energy display method") configured to compare energy consuming propensity of a user with that of another user having a similar living environment, thereby promoting and inducing a more active energy conservation and rational energy consumption.

In one general aspect of the present disclosure, there is provided an energy display apparatus, the apparatus comprising: a smart meter detecting an energy-related data of an energy user; input means receiving a comparison condition from the energy user for comparing energy-related data of other energy users; statistics information processing means receiving and processing the energy related data of other energy users in response to the inputted comparison condition; and an IHD (In Home Display) displaying a result of the statistics information processing means.

Preferably, the comparison condition is selectively applied according to a selection of a size of a house, the number of families, and an energy consumption region.

Preferably, the input means is positioned at the IHD.

Preferably, the input means is positioned at the smart meter.

Preferably, the statistical information processing means is positioned at a data concentration device, wherein the data concentration device is a device relaying data transmission and data reception between smart meters in a predetermined region and a smart metering system server comprehensively controlling the smart meters.

Preferably, the statistical information processing means is positioned at the smart metering system server comprehensively controlling the smart meters.

Preferably, the IHD displays an energy usage rate of a relevant energy user in relation to an energy usage rate distribution of other energy users.

Preferably, the IHD displays an average value of energy usage rates of other energy users and the energy usage rate of a relevant energy user.

Preferably, the IHD displays an energy usage amount of a relevant energy user in relation to an energy usage amount distribution of other energy users.

Preferably, the IHD displays an average value of energy usage amount of other energy users and the energy usage amount of a relevant energy user.

In another general aspect of the present disclosure, there is provided an energy display method, the method comprising: detecting an energy-related data of an energy user; receiving a comparison condition from the energy user for comparing energy-related data of other energy users; receiving and processing the energy related data of other energy users in response to the inputted comparison condition (statistical information processing step); and displaying a result of the statistics information processing step (display step).

Preferably, the comparison condition is selectively applied according to a selection of a size of a house, the number of families, and an energy consumption region.

Preferably, the comparison condition is inputted through an IHD.

Preferably, the comparison condition is inputted through a smart meter.

Preferably, the statistical information processing step is performed by a data concentration device, wherein the data concentration device is a device relaying data transmission and data reception between smart meters in a predetermined region and a smart metering system server comprehensively controlling the smart meters.

Preferably, the statistical information processing step is performed by the smart metering system server comprehensively controlling the smart meters.

Preferably, the display step displays an energy usage rate of a relevant energy user in relation to an energy usage rate distribution of other energy users.

Preferably, the display step displays an average value of energy usage rates of other energy users and the energy usage rate of a relevant energy user.

Preferably, the display step displays an energy usage amount of a relevant energy user in relation to an energy usage amount distribution of other energy users.

Preferably, the display step displays an average value of energy usage amount of other energy users and the energy usage amount of a relevant energy user.

The energy display apparatus and energy display method according to the present disclosure is advantageous in that each energy consuming user can compare his or her energy consuming propensity such as energy usage amount, energy usage rate and increase/decrease trend of energy use with that of other users, whereby his or her position related to energy consumption of each user can be objectively viewed as a stimulant, leading to induce an active energy conservation and rational energy consumption.

The energy display apparatus and energy display method according to the present disclosure is advantageous in that particularly, energy consuming propensity of each user can be compared with that of other users in similar environments including size of house, the number of families and energy consuming areas, whereby each user can more objectively evaluate energy consuming propensity, where various pieces of statistics information for comparison can be provided through an IHD installed at each house to allow each user to easily and conveniently evaluate own energy consuming propensity.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The terms "power" and "energy" may be used interchangeably herein. It is to be understood that "power" generally refers to a rate at which work is performed (e.g., measured in watts or comparable units), while "energy" generally refers to a capacity for doing work (e.g., measured in kilowatt-hours (kWh), joules or comparable units). However, the term "power" may be used herein to refer to both. For example, the term "power" as used herein may refer to a rate of transfer, use, or generation of electrical energy as well as electrical energy itself. It should also be noted that as used herein, the term "bill" may be used to refer to the more general term "cost." Furthermore, the term "bill" may refer to a bill balance (where a billing cycle for the bill is not yet completed, for example).

As used herein, an energy user and an energy consumer may be interchangeably used.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. In the drawings, the size and relative sizes of layers, regions and/or other elements may be exaggerated or reduced for clarity.

Now, an energy display apparatus and energy display method according to an exemplary embodiment of the present disclosure will be described in detail with reference to the accompanying drawings.

Figure 1:
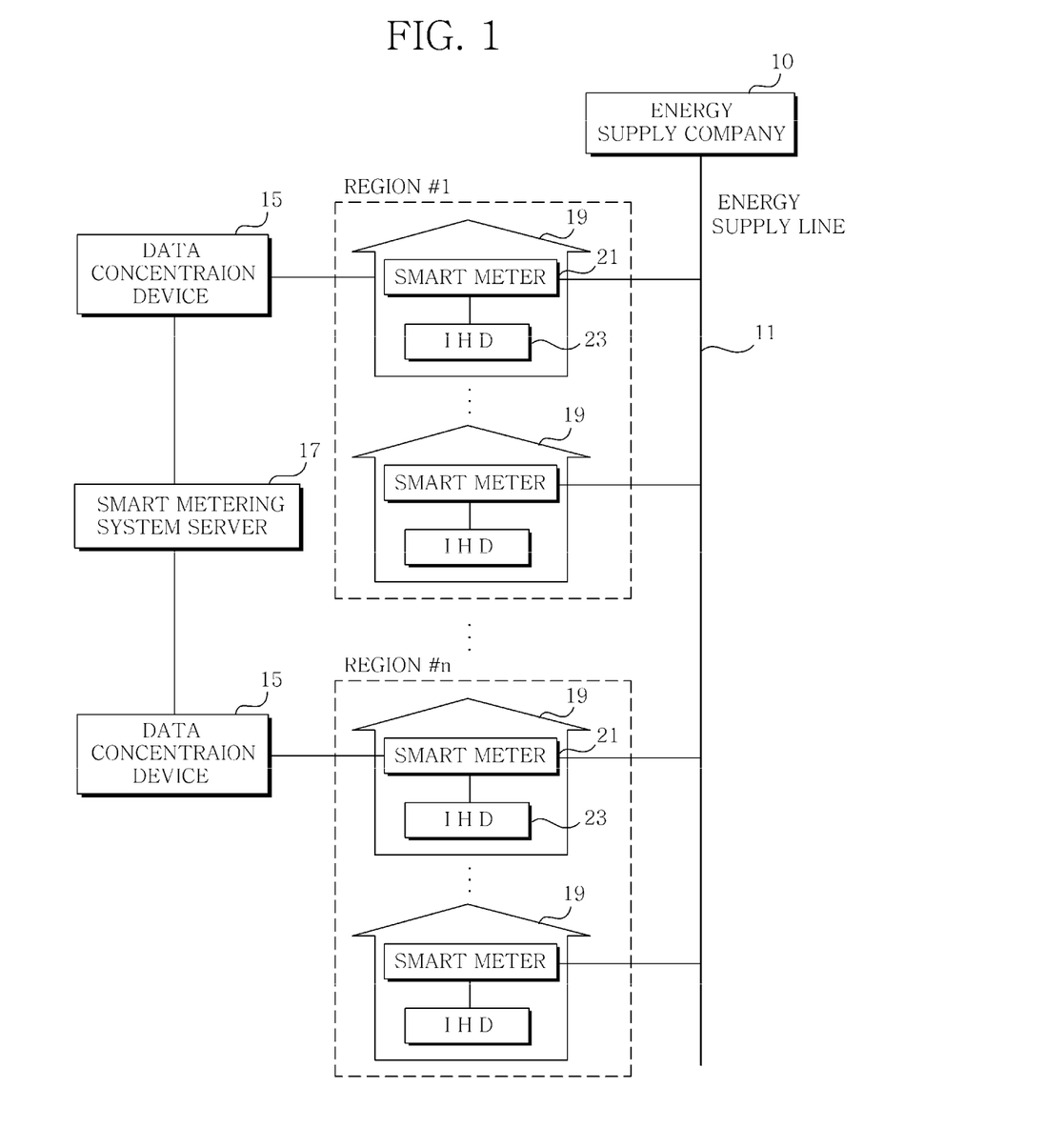
FIG. 1 is a lateral view illustrating an overall energy management system.

FIG. 1 is a lateral view illustrating an overall energy management system, in which energy supply company (10) supplies energy through an energy supply line (11) and an energy consumer (energy user. 19) uses the energy supplied through the energy supply line (11). Unless otherwise specified in the present disclosure, the energy includes any one of electricity, gas and water.

The energy consumer or energy user (19) is an energy management unit of the energy supply company (10) such as a house, an office and a factory. The energy consumer (19) is installed with a smart meter (21) and an IHD (In-Home Display. 23), and although not illustrated separately, the energy consumer (19) is equipped with various loads consuming the energy transmitted through the energy supply line (11).

The smart meter (21) is an energy meter having a communication function. The smart meter (21) may be a power meter, a gas meter and a water meter and detects energy-related data (e.g., energy usage amount) of the energy consumer (19). The smart meter (21) may be variable configured according to types of energy and required functions, and wirelessly or wiredly communicate with the IHD (23).

The IHD (23) is a display device installed at the energy consumer (19) and can communicate with the smart meter (21), a data concentration device (15) and a smart metering system server (17) through various wireless or wired communication networks. The IHD (23) functions to display various pieces of energy-related information on a screen as an interface with the energy consumer (19).

The smart metering system server (17) serves to comprehensively manage the energy usage of the energy consumer (19) by collecting energy usage information of the energy consumer (19) through communication with the smart meter (21), or providing various pieces of energy information.

Although the smart meter (21) and the IHD (23) can forthrightly communicate therebetween, the smart meter (21) and the IHD (23) may also communicate with the data concentration device (15) of each region (area).

The data concentration device (15) is a device installed at each region (e.g., an apartment complex and/or an energy consumer concentration area with a predetermined number of energy consumers), and serves to collect upward data of a relevant area and transmit the data to the smart metering system server (17), or receive downward data transmitted from the smart metering system server (17) to each area and relay the downward data to an energy consumer of relevant region.

Figure 2:
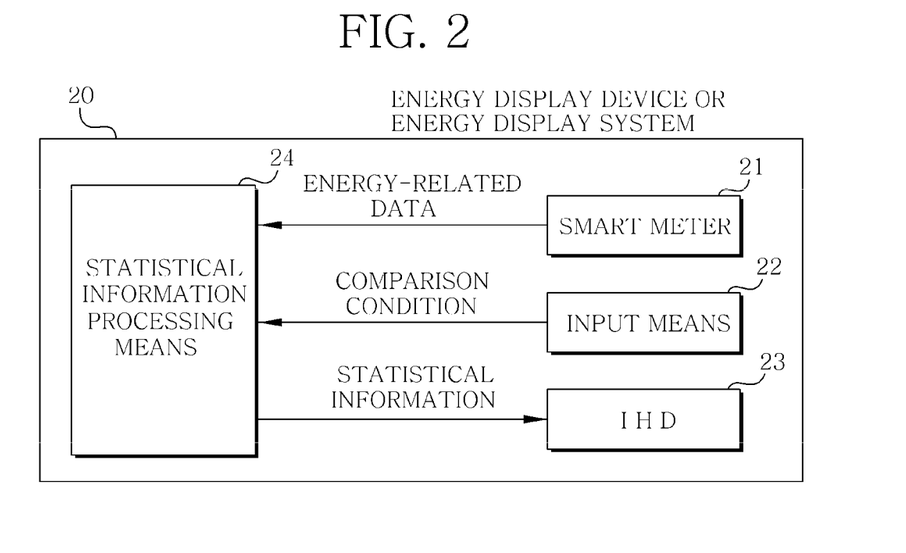
FIG. 2 is a schematic view illustrating an energy display system (energy display device) according to an exemplary embodiment of the present disclosure.

Referring to FIG. 2, an energy display device (or energy display system. 20) according to the present disclosure includes a smart meter (21), input means (22), an IHD (23) and statistical information processing means (24).

The smart meter (21) functions to detect energy-related data of the energy consumer, e.g., the energy usage amount. The energy-related data detected by the smart meter (21) is transmitted to and managed by the smart metering system server (17), and may be transmitted through the data concentration device (15) in the process thereof.

The input means (22) serves to input a comparison condition, which is information for comparing energy consumption propensity of an energy consumer, and transmits the inputted comparison condition to the statistical information processing means (24). The comparison condition is information for comparing energy consumption propensity among energy consumers of similar living environments, where types and contents of comparison conditions may be variably configured to compare the energy consumption propensity of energy consumers in terms of various viewpoints. Detailed examples of the comparison conditions may include size of a home, the number of families and energy consuming regions.

The input means (22) receiving the comparison conditions may be variably configured. In a non-limiting example, the function of the input means (22) may be performed by the IHD (23). Furthermore, the function of the input means (22) may be performed by the smart meter (21), if the smart meter (21) is equipped with a user interface function capable of receiving the comparison conditions from the energy consumers. In the present exemplary embodiment, the IHD (23) or the smart meter (21) may be embedded with a function capable of performing the input means (22).

Figure 3:
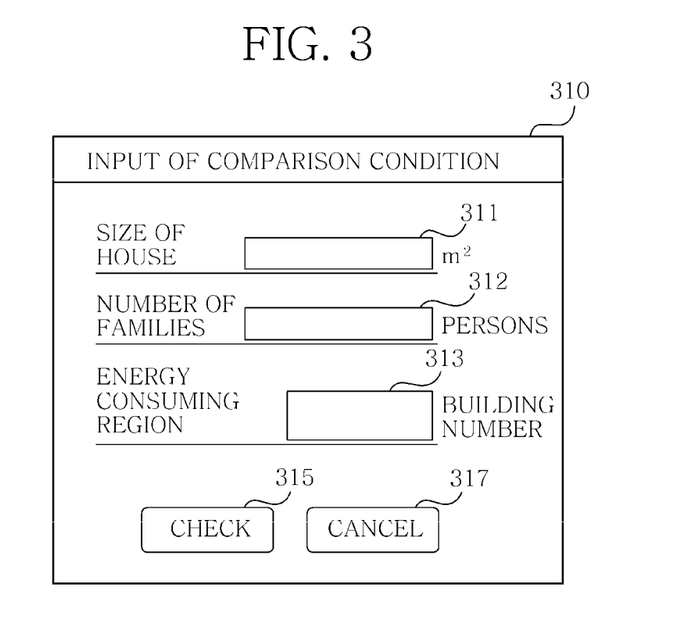
FIG. 3 is a schematic view illustrating an example of a comparison condition input screen provided by input means.

FIG. 3 is a schematic view illustrating an example of a comparison condition screen (310) provided by the input means (22) capable of forthrightly inputting the comparison condition through the smart meter (21) or the IHD (23).

The energy consumer may input the size of a house by the meter unit or by the pyung (3.3 cm$^2$) in a house size blank (311), the number of family members in a family number blank (312), and a position (region) of the energy consumer in an energy consuming region blank (313). At this time, it should be apparent that each blank (311, 312, 313) may propose several values to allow the energy user to select one of the values.

If a check button (315) is selected, the inputted comparison information is transmitted to the statistical information processing means (24), and if a cancellation button (317) is selected, the input of comparison conditions is cancelled.

Meanwhile, a manager managing a joint house such as an apartment house may input comparison conditions of each household in one package, because it is cumbersome and not easy for the energy consumer to individually input the comparison condition. At this time, a server (e.g., a smart meter) may provide a screen capable of inputting a comparison condition of each household by a manager of the apartment house capable of being approached through a communication network, and the manager may receive the comparison conditions of each household through the screen in one package.

The statistical information processing means (24) stores and manages for each energy consumer the information of the comparison conditions inputted through the input means (22), and the energy-related data detected by the smart meter (21).

Furthermore, the statistical information processing means (24) transmits statistical information capable of allowing each energy consumer to compare own energy consuming propensity with that of other energy consumers in a similar living environment by selecting and statistically processing the energy consumers in the similar living environments using the comparison conditions. The function of the statistical information processing means (24) may be performed by the data concentration device (15) or the smart metering system server (17).

The IHD (23) receives the statistical information from the statistical information processing means (24) and visually displays the received statistical information on the screen.

Now, a detailed example of the statistical information received from the statistical information processing means (24) and displayed on the screen will be described.

The statistical information processing means (24) may display an energy usage rate of a relevant energy user in relation to an energy usage rate (bill) distribution of energy users identical in terms of comparison condition or matching within a predetermined scope. Then, the energy user compares an energy usage rate (bill) of other energy users similar in terms of living environment with his energy usage rate to objectively grasp the used amount of energy, whereby own energy usage can be more actively adjusted.

FIG. 4a exemplifies the number of energy consumers for each energy usage rate using a graph, where his or her own position (A) is displayed in an energy usage amount distribution of energy users in the similar living environment.

At this time, the energy usage rate may be processed in an average value during a predetermined period (e.g., a week, a month, a summer season and/or a winter season), or an average value of entire energy user and an energy usage rate of a relevant energy user may be displayed.

The statistical information processing means (24) may display an energy usage amount of a relevant energy user in relation to an energy usage amount distribution of energy users identical in terms of comparison condition or matching within a predetermined scope. Then, the energy user compares an energy usage amount of other energy users similar thereto in terms of living environment with that of his or her own to objectively grasp the used amount of energy, whereby own energy usage can be more actively adjusted.

At this time, the energy usage amount may be processed in an average value during a predetermined period (e.g., a week, a month, a summer season and/or a winter season), or an average value of entire energy user and an energy usage amount of a relevant energy user may be displayed.

Figure 5:
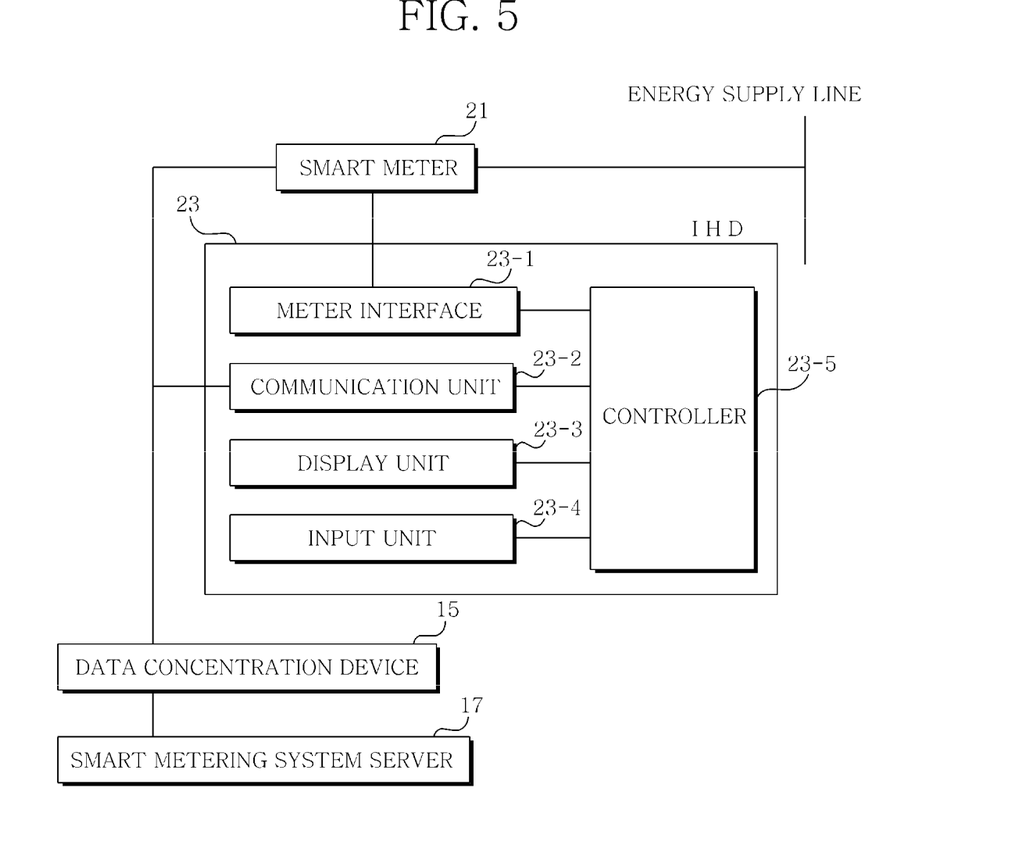
FIG. 5 is a schematic view illustrating a detailed example of an IHD.

FIG. 5 is a schematic view illustrating a detailed example of an IHD, where the IHD (23) may include a meter interface (23-1), a communication unit (23-2), a display unit (23-3), an input unit (23-4) and a controller (23-5).

The meter interface (23-1) enables the IHD (23) to communicate with the smart meter (21) using a wired or wireless local area communication method.

The communication unit (23-2) provides an interface capable of communicating with the smart metering system server (17) or the data concentration device (15). In case the IHD (23) communicates with the smart metering system server (17) or the data concentration device (15) through the smart meter (21), the communication unit (23-2) may be dispensed with.

The display unit (23-3) serves to output various pieces of information related to the operation of IHD (21) on a display screen. The input unit (23-4) may be configured using various input devices such as a keypad and a touch screen, and may input information necessary for operation of IHD (21) by the energy user.

The controller (23-5) comprehensively controls the IHD (23), and may be formed using a microprocessor or a CPU (Central Processing Unit).

Basically, the controller (23-5) communicates with the smart meter (21) through the meter interface (23-1) to display on the display unit (23-3) various pieces of information related to energies such as energy usage amount, energy usage rate and energy price. Furthermore, the controller (23-5) requests the statistical information processing means (24) of statistical information in response to an instruction by the user inputted through the input unit (23-4), and displays on the display unit (233-3) the statistical information received through the communication unit (23-3) in response to the request.

Figure 6:
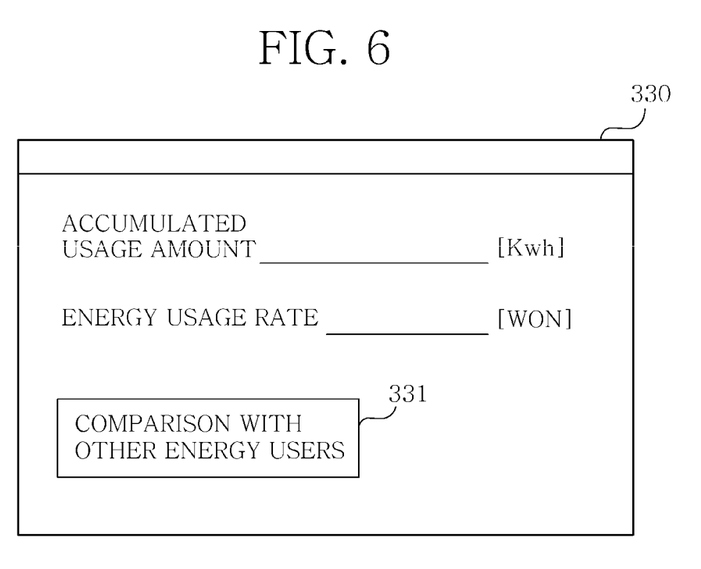
FIG. 6 is a schematic view illustrating a user interface screen requesting statistical information.

FIG. 6 is a schematic view illustrating an example of a user interface screen (330) capable of requesting statistical information. The user interface screen (330) is displayed with basic information such as current accumulated usage amount and energy usage rate, and if the energy user selects a "comparison with other users" button (331), the user interface screen (330) transmits a statistical information request message to the statistical information processing means (24).

With reference to statistical information request, the energy user may input the comparison conditions when requesting the statistical information, and may not need to input the comparison conditions again if the comparison conditions are already inputted.

In case the IHD (23) performs the function of the input means (22), the controller (23-5) outputs through the display unit (23-3) the user interface screen capable of inputting the comparison conditions as shown in FIG. 3, and the energy user transmits the inputted comparison conditions to the statistical information processing means (24).

Figure 7:
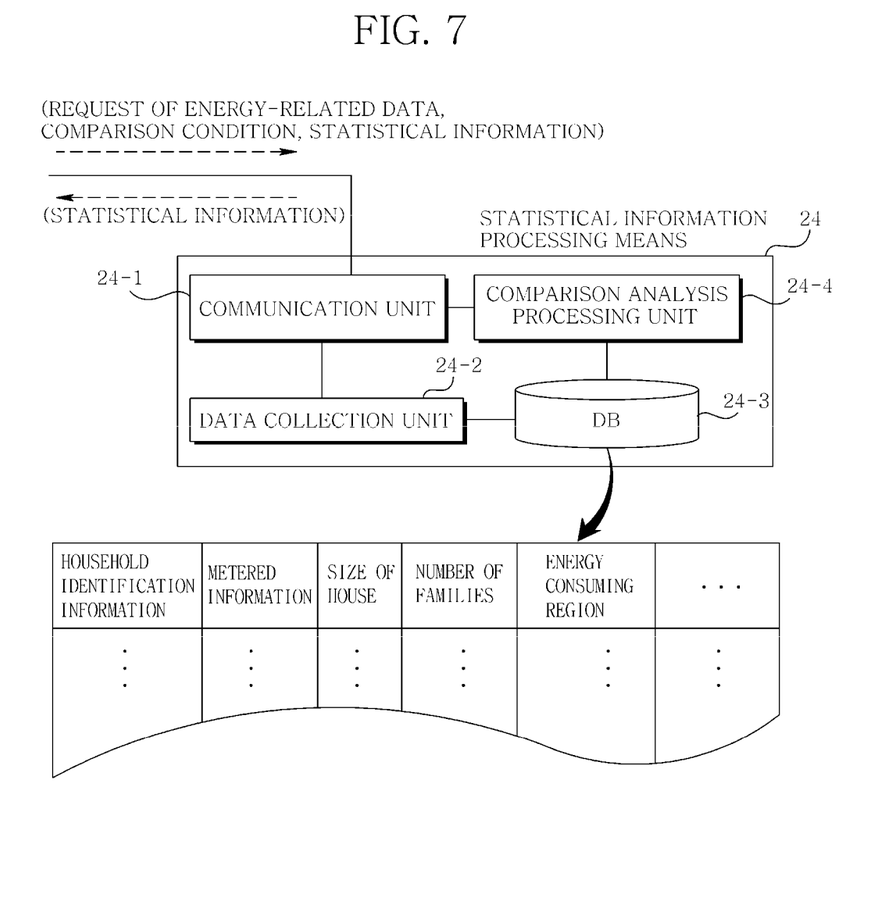
FIG. 7 is a schematic view illustrating a detailed example of statistical information processing means.

FIG. 7 is a schematic view illustrating a detailed example of the statistical information processing means (24), where the statistical information processing means (24) includes a communication unit (24-1), a data collection unit (24-2), a database (24-3), and a comparison analysis processing unit (24-4).

The communication unit (24-1) enables the comparison analysis processing unit (24-4) to communicate through a communication network, and the data collection unit (24-2) stores and manages metered information of each energy user (e.g., energy usage information) received through the communication unit (24-1) and comparison condition information in the database (24-3). The database (24-3) is stored with information necessary for providing statistical information according to the present disclosure including metered information of each energy user, a size of a house, the number of families and an energy consumption region, and manages the information.

Figure 4:
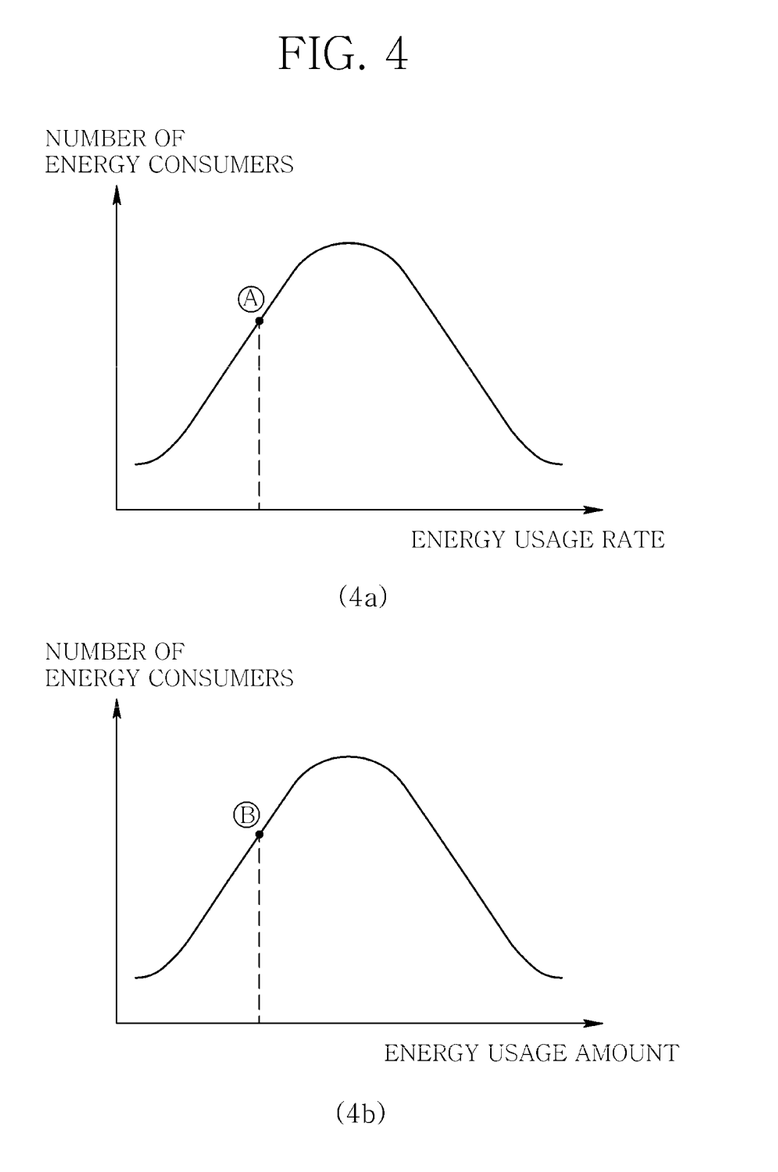
FIG. 4 is a schematic view illustrating an example of statistical information displayed on a screen for comparison.

The comparison analysis processing unit (24-4) checks the information stored in the database (24-3) in response to request of statistical information by each energy user to seek an energy usage group having a living environment similar to that of a relevant energy user, and as illustrated in FIG. 4, statistical information capable of comparing energy consumption propensity of energy user is generated and transmitted to the IHD (23) of the relevant energy user through the communication unit (24-1).

In a non-limiting example, in a case an energy user having requested the statistical information lives in Seocho-dong, Seocho-gu, Seoul, has a house of 30 pyung (3.3 $cm^2$) and has five family members, the statistical information processing means (24) searches for an energy user having a same living condition (or a similar condition within a predetermined scope) from the database (24-3).

Thereafter, the statistical information processing means (24) calculates energy usage rates of searched energy users, energy usage amount distribution and a position of the relevant energy user and transmits same to the IHD (23).

The comparison analysis processing unit (24-4) may periodically generate statistical information and transmit the information to each energy user. In this case, the IHD of each energy user may store and promptly display the relevant statistical information in response to request of the energy user.

Figure 8:
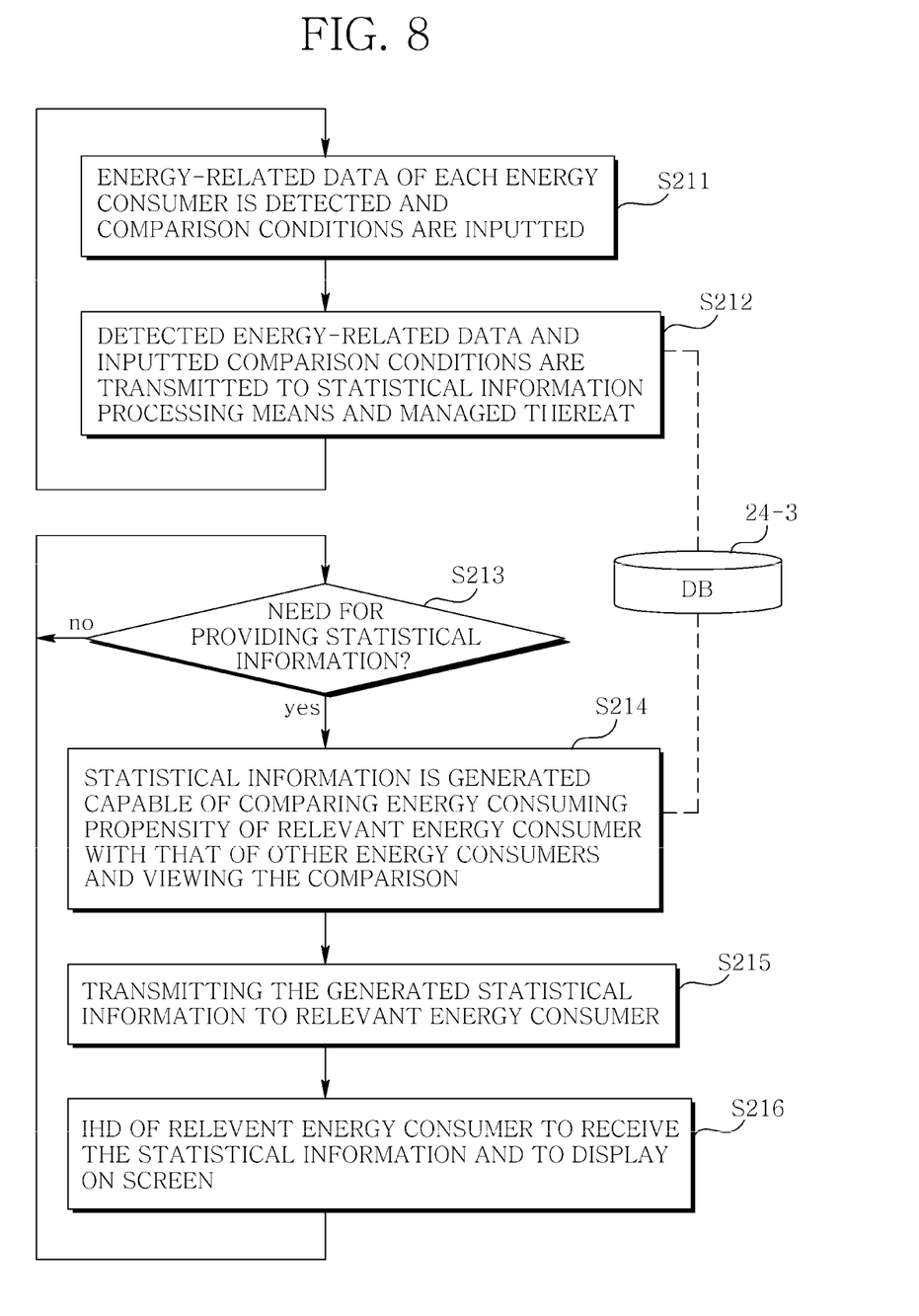
FIG. 8 is a schematic view illustrating an energy display method according to an exemplary embodiment of the present disclosure.

FIG. 8 is a schematic view illustrating an energy display method according to an exemplary embodiment of the present disclosure.

First, energy-related data such as energy usage amount is detected by a smart meter installed at each energy user, and comparison conditions of each energy user are inputted (S211), where the comparison condition defines information for comparing energy consumption propensities among energy users each having a similar living environment, and where types and contents of comparison conditions may be variably configured in every way from various viewpoints for comparing energy consumption propensities of energy users.

Detailed examples of the comparison conditions may include size of a home, the number of families and energy consuming regions. The comparison conditions may be inputted through various methods and routes.

As one of the examples, a comparison condition may be received from an energy user by the IHD (23) that provides a user interface capable of receiving the comparison condition.

If a smart meter is equipped with a user interface function capable of receiving the comparison condition, the comparison condition may be received by the smart meter.

Meanwhile, a manager managing a joint house such as an apartment house may input comparison conditions of each household in one package, because it is cumbersome and not easy for the energy consumer to individually input the comparison condition. At this time, a server (e.g., a smart meter) may provide a screen capable of inputting a comparison condition of each household by a manager of the apartment house capable of being approached through a communication network, and the manager may receive the comparison conditions of each household through the screen in one package.

The energy-related data detected through S211, and the inputted comparison condition are transmitted to statistical information processing means, where the statistical information processing means stores the energy-related data of each energy user and the comparison information in the database (24-3) and manages the same (S212).

The steps of S211 and S212 are processes that can be performed at any time, through which energy usage information of each energy usage and information on the comparison conditions (size of a house, the number of families and energy consuming regions) are collected, accumulated, and updated to recent information.

As described in FIG. 1, the smart meter (21) and IHD (23) installed at each energy user may forthrightly communicate with the smart metering system server (17), or communicate with the smart metering system server (17) through the data collection device (15). At this time, function of the statistical information processing means may be performed by the smart metering system server or the data collection device (15).

The input means (22) functions to receive the comparison condition which is information for comparing energy consuming propensities of energy users, and transmits the inputted comparison conditions to the statistical information processing means (24).

Meanwhile, the statistical information processing means (24) generates (S214) statistical information capable of comparing, by a relevant energy user, energy consuming propensities of other energy users with his or her own energy consuming propensity using the information stored in the database (24-3), if there is a need for providing the statistical information (S213).

That is, the statistical information processing means seeks from the database (24-3) an energy user group having living environment identical or similar to that of an energy user to which the statistical information is transmitted, and as described in FIG. 4, and generates statistical information capable of providing comparison of energy consuming propensity of the energy user.

The need for providing the statistical information at step of S213 may be generated in various cases. In a non-limiting example, the need may be generated when any one of energy users requests the statistical information, or the need may be also generated when a relevant period has matured, if configuration is so constructed as to allow the statistical information processing means to periodically transmit the statistical information.

The statistical information processing means transmits the statistical information generated in the S214 to the IHD of a relevant energy user (S215), and the IHD of the relevant energy user displays the received statistical information on the screen (S216).

As described in FIG. 4a, the step of S216 may display an energy usage rate of a relevant energy user in relation to an energy usage rate distribution of energy users identical in terms of comparison condition or matching within a predetermined scope. At this time, the energy usage amount may be processed in an average value during a predetermined period (e.g., a week, a month, a summer season and/or a winter season), or an average value of entire energy user and an energy usage rate of a relevant energy user may be displayed.

Furthermore, as described in FIG. 4b, an energy usage amount of a relevant energy user in relation to an energy usage amount distribution of energy users identical in terms of comparison condition or matching within a predetermined scope may be displayed. At this time, the energy usage amount may be processed in an average value during a predetermined period (e.g., a week, a month, a summer season and/or a winter season), or an average value of entire energy user and an energy usage amount of a relevant energy user may be displayed.

The energy display apparatus and energy display method according to the present disclosure has an industrial applicability in that each energy consuming user can compare his or her energy consuming propensity such as energy usage amount, energy usage rate and increase/decrease trend of energy use with that of other users, whereby his or her position related to energy consumption of each user can be objectively viewed as a stimulant, leading to induce an active energy conservation and rational energy consumption.

The energy display apparatus and energy display method according to the present disclosure has an industrial applicability in that energy consuming propensity of each user can be compared with that of other users in similar environments including size of house, the number of families and energy consuming areas, whereby each user can more objectively evaluate energy consuming propensity, where various pieces of statistics information for comparison can be provided through an IHD installed at each house to allow each user to easily and conveniently evaluate own energy consuming propensity.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An energy display apparatus, the apparatus comprising:
   a smart meter configured to detect energy-related data of an energy user;
   an input part positioned at the smart meter and configured to receive a comparison condition from the energy user for comparing energy-related data of other energy users;
   a statistical information processing part configured to process the energy related data of other energy users in response to the inputted comparison condition; and
   an IHD (In Home Display) configured to display a result of the statistical information processing part;
   wherein:
   the comparison condition is input via the smart meter; and
   the statistical information processing part is positioned at a smart metering system server configured to control smart meters.

2. The apparatus of claim 1, wherein the comparison condition is selectively applied according to a selection of a size of a house, a number of families, or an energy consumption region.

3. The apparatus of claim 1, wherein the statistical information processing part is positioned at a data concentration device configured to relay data transmission and data reception between smart meters in a predetermined region and the smart metering system server.

4. The apparatus of claim 1, wherein the IHD is further configured to display an energy usage rate of a relevant energy user in relation to an energy usage rate distribution of other energy users.

5. The apparatus of claim 1, wherein the IHD is further configured to display an average value of energy usage rates of other energy users and the energy usage rate of a relevant energy user.

6. The apparatus of claim 1, wherein the IHD is further configured to display an energy usage amount of a relevant energy user in relation to an energy usage amount distribution of other energy users.

7. The apparatus of claim 1, wherein the IHD is further configured to display an average value of energy usage amount of other energy users and the energy usage amount of a relevant energy user.

8. An energy display method, the method comprising:
   detecting an energy-related data of an energy user via a smart meter;
   receiving a comparison condition from the energy user via an input part positioned at the smart meter, the comparison condition for comparing energy-related data of other energy users;
   processing the energy related data of other energy users in response to the inputted comparison condition via a smart metering system server configured to control smart meters; and
   displaying a result of the processing the energy related data.

9. The method of claim 8, wherein the comparison condition is selectively applied according to a selection of a size of a house, a number of families, or an energy consumption region.

10. The method of claim 8, wherein processing the energy related data is performed by a data concentration device configured to relay data transmission and data reception between smart meters in a predetermined region and the smart metering system server.

11. The method of claim 8 further comprising displaying an energy usage rate of a relevant energy user in relation to an energy usage rate distribution of other energy users.

12. The method of claim 8 further comprising displaying an average value of energy usage rates of other energy users and the energy usage rate of a relevant energy user.

13. The method of claim 8 further comprising displaying an energy usage amount of a relevant energy user in relation to an energy usage amount distribution of other energy users.

14. The method of claim 8 further comprising displaying an average value of energy usage amount of other energy users and the energy usage amount of a relevant energy user.

* * * * *